United States Patent
Guerinon et al.

(10) Patent No.: US 9,987,884 B2
(45) Date of Patent: Jun. 5, 2018

(54) TIRE HAVING LOW ROLLING RESISTANCE (71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Bernard Guerinon, Clermont-Ferrand (FR); Eric Berger, Clermont-Ferrand (FR); Melaine Guillou, Clermont-Ferrand (FR); Bertrand Boisdon, Clermont-Ferrand (FR); Christine Nourry, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 322 days.

(21) Appl. No.: 14/652,431

(22) PCT Filed: Dec. 11, 2013

(86) PCT No.: PCT/EP2013/076161
§ 371 (c)(1),
(2) Date: Jun. 15, 2015

(87) PCT Pub. No.: WO2014/090845
PCT Pub. Date: Jun. 19, 2014

(65) Prior Publication Data
US 2015/0328931 A1    Nov. 19, 2015

Related U.S. Application Data
(60) Provisional application No. 61/776,005, filed on Mar. 11, 2013.

(30) Foreign Application Priority Data

Dec. 14, 2012  (FR) ..................... 12 62084

(51) Int. Cl.
*B60C 11/00*   (2006.01)
*B60C 11/12*   (2006.01)
(Continued)

(52) U.S. Cl.
CPC .......... *B60C 11/005* (2013.01); *B60C 1/0016* (2013.01); *B60C 5/00* (2013.01);
(Continued)

(58) Field of Classification Search
CPC ......... B60C 11/0058; B60C 2011/0025; B60C 2011/1286; B60C 2011/129; B60C 2011/1295
See application file for complete search history.

(56) References Cited

U.S. PATENT DOCUMENTS 2,094,636 A * 10/1937 Bull .................... B60C 11/0332
152/209.28
2,186,180 A * 1/1940 Sloman ............... B60C 11/0309
152/209.2
(Continued)

FOREIGN PATENT DOCUMENTS

EP    1 431 078        6/2004
JP    03-025003 A  *  2/1991
(Continued)

OTHER PUBLICATIONS

Machine translation for Japan 2000-142035 (no date).*
(Continued)

*Primary Examiner* — Steven D Maki
(74) *Attorney, Agent, or Firm* — Cozen O'Connor (57) ABSTRACT

Tire tread having a central part (I) made from at least one first rubber compound and having at least one circumferen-
(Continued)

tial rib (121-123) formed of a plurality of blocks (1210) separated by sipes; a first and a second lateral part (II and III) made of at least a second and third rubber compound, and having a circumferential rib (131,141) formed by a plurality of blocks (1310,1410), separated by sipes, wherein the at least one second and third rubber compounds have a value of tan δ at 23° C.—at a frequency of 10 Hz and an elongation of 10%—of less than 0.25, wherein the complex modulus G*(T) of the at least one first rubber compound is greater than the complex moduli G*(T) of at least one second and third rubber compounds for all temperatures T greater than or equal to 0° and less than or equal to 60° C.

8 Claims, 5 Drawing Sheets

(51) Int. Cl.
  *B60C 5/00* (2006.01)
  *B60C 11/03* (2006.01)
  *B60C 1/00* (2006.01)
  *B60C 11/11* (2006.01)
(52) U.S. Cl.
  CPC .......... *B60C 11/0058* (2013.01); *B60C 11/03* (2013.01); *B60C 11/0304* (2013.01); *B60C 11/11* (2013.01); *B60C 2011/0025* (2013.01); *B60C 2011/0033* (2013.01); *B60C 2011/129* (2013.01); *B60C 2011/1209* (2013.01); *B60C 2011/1286* (2013.01); *B60C 2011/1295* (2013.01); *Y02T 10/862* (2013.01)

(56) References Cited

U.S. PATENT DOCUMENTS

| | | | | |
|---|---|---|---|---|
| 4,444,236 A | * | 4/1984 | Kan | B60C 1/0016 152/209.5 |
| 4,856,571 A | * | 8/1989 | Collette | B60C 11/0306 152/209.18 |
| 4,926,919 A | * | 5/1990 | Hopkins | B60C 11/0306 152/209.22 |
| 5,918,654 A | * | 7/1999 | Bossut | B60C 11/12 152/209.14 |
| 6,082,423 A | | 7/2000 | Roesgen et al. | |
| 2002/0148545 A1 | * | 10/2002 | Nanni | B60C 1/0016 152/450 |
| 2004/0112490 A1 | * | 6/2004 | Sandstrom | B60C 11/18 152/152.1 |
| 2004/0118495 A1 | | 6/2004 | Sandstrom et al. | |
| 2005/0183807 A1 | * | 8/2005 | Hildebrand | B60C 11/0306 152/209.2 |
| 2012/0325387 A1 | * | 12/2012 | Koga | B60C 11/0306 152/209.18 |

FOREIGN PATENT DOCUMENTS

| | | | |
|---|---|---|---|
| JP | 03-169719 | | 7/1991 |
| JP | 04-278807 A | * | 10/1992 |
| JP | 06-262909 | | 9/1994 |
| JP | 07-164821 A | * | 6/1995 |
| JP | 09-207523 | | 8/1997 |
| JP | 2000-142035 A | * | 5/2000 |
| JP | 2008-024045 | | 2/2008 |
| WO | WO-2011/090203 A1 | * | 7/2011 |

OTHER PUBLICATIONS

Machine translation for Japan 07-164821 (no date).*
Machine translation for Japan 04-278807 (no date).*
Machine translation for Japan 03-025003 (no date).*
Office Action dated Apr. 17, 2017 which issued in the corresponding Japanese Patent Application No. 2015-546989.

* cited by examiner

TIRE HAVING LOW ROLLING RESISTANCE

RELATED APPLICATIONS

This application is a U.S. National Phase application under 35 USC § 371 of International Application PCT/EP2013/076161 filed Dec. 11, 2013.

This application claims the priority of French application no. 1262084 filed Dec. 14, 2012 and of U.S. provisional application No. 61/776,005, the content of all of which are hereby incorporated by reference.

FIELD OF THE INVENTION

The present invention relates to the field of tires for passenger vehicles and, more specifically, tires with low rolling resistance. It relates notably to the crowns of such tires.

BACKGROUND OF THE INVENTION

Research into tires the use of which reduces the energy consumption of the vehicle is now of increasing importance. One of the promising areas being explored by tire manufacturers is that of reducing the rolling resistance of the tires, notably by using low-hysteresis materials, and also reducing the mass of the tires.

It has been proposed that the mass of the tires be reduced by reducing the thicknesses of material and the specific mass of the reinforcements (through the use of textile cords) or of the compositions, or by using reinforcements that allow certain volumes of internal compositions to be reduced, for example in the bead area. Such tires are set out, for example, in U.S. Pat. No. 6,082,423 and in the documents cited in that document. Another way of reducing the mass of the tire is to reduce its overall dimensions.

All of this work has contributed towards the marketing of tires with very low rolling resistance, such as the "Energy Saver" tire marketed by the applicant company.

In spite of all the progress made over the past few years, there is still a major need to reduce the rolling resistance of tires still further while at the same time maintaining, or even improving, other performance aspects such as resistance to wear, grip or even road holding. The present invention seeks to address this need.

SUMMARY OF THE INVENTION

One of the objects of the present invention is to define a passenger vehicle tire that has very low rolling resistance. This object is achieved using a tire comprising:

two beads intended to come into contact with a mounting rim, each bead comprising at least one annular reinforcing structure defining a median plane perpendicular to the axis of rotation of the tire and situated equidistant from the annular reinforcing structures of each bead, two sidewalls extending the beads radially outwards, the two sidewalls meeting in a crown comprising a crown reinforcement radially surmounted by a sub-tread (also sometimes referred to as "tread sublayer" or "undertread layer") extending across the entire axial width of the crown reinforcement and itself surmounted by a tread provided with a tread pattern formed of elements in relief, the tread having, in each radial section, a first axial edge and a second axial edge;

wherein the tread comprises a central part made of at least one first rubber compound extending, in each radial section, on either side of the median plane, between a first axial end and a second axial end, the central part comprising at least one circumferential rib formed of a plurality of blocks separated by sipes so that the mean distance separating two adjacent blocks is less than 0.8 mm, the number of blocks being greater than or equal to 100;

a first lateral part made of at least one second rubber compound, extending from the first axial edge of the tread as far as the first axial end of the said central part, the first lateral part comprising at least one circumferential rib formed by a plurality of blocks separated by sipes so that the mean distance separating two adjacent blocks is greater than 0.8 mm and less than 5 mm (and preferably less than 2 mm), the number of blocks being less than the number of blocks that make up the said at least one circumferential rib of the central part; and a second lateral part made of at least one third rubber compound, extending from the second axial edge of the tread as far as the second axial end of the said central part, the second lateral part comprising at least one circumferential rib formed by a plurality of blocks separated by sipes so that the mean distance separating two adjacent blocks is greater than 0.8 mm and less than 5 mm (and preferably less than 2 mm), the number of blocks being less than the number of blocks that make up the said at least one circumferential rib of the central part;

wherein the said at least one second and third rubber compounds have a value of tan $\delta$ at 23° C., at a frequency of 10 Hz and an elongation of 10%, which is less than 0.25;

wherein the complex modulus $G^*(T)$ of the said at least one first rubber compound is greater than the complex moduli $G^*(T)$ of the said at least one second and third rubber compounds for all temperatures T greater than or equal to 0° and less than or equal to 60° C.

Such a tire has a rolling resistance that is very low by comparison with a comparable conventional tire.

Even better results are obtained when the sub-tread is made of at least one fourth rubber compound having a complex modulus $G^*(T)$ and a value of tan $\delta$ at 23° C., at a frequency of 10 Hz and an elongation of 10%, which are such that its complex modulus $G^*(T)$ is less than the complex moduli $G^*(T)$ of the said at least one first, second and third rubber compounds for all temperatures T greater than or equal to 0° and less than or equal to 60° C., and that its value of tan $\delta$ is less than the tan $\delta$ value of the said at least one first, second and third rubber compounds.

According to one advantageous embodiment, the said at least one rib of the central part satisfies the following inequality:

$$0.90 \cdot EC/RC < SLEC/(2 \cdot \pi \cdot RC) < 1.10 \cdot EC/RC$$

where EC denotes the mean radial thickness of the tread measured at the rib of the central part, RC denotes the mean radius of the rib of the central part, and SLEC denotes the sum of the mean circumferential widths of the sipes of the rib of the central part; and each of the at least one ribs of the first and of the second lateral part satisfies the following inequality:

$$1.50 \cdot EL/RL < SLEL/(2 \cdot \pi \cdot RL)$$

where EL denotes the mean radial thickness of the tread measured at the rib of the lateral part, RL denotes the mean radius of the rib of the lateral part, and SLEL denotes the sum of the mean circumferential widths of the sipes of the rib of the lateral part.

This embodiment makes it possible to reduce the rolling resistance even further by comparison with a comparable conventional tire.

According to a second embodiment, the said at least one third rubber compound is identical to the said at least one second rubber compound. This embodiment is advantageous because it has the effect of reducing the total number of different rubber compounds.

According to a preferred third embodiment, the boundary between the said central part and the said first and second lateral parts lies in a circumferential groove of the tread.

According to a fourth embodiment, the boundary between the said central part and each of the said first and second lateral parts is formed of an interface surface, this interface surface being inclined with respect to the median plane so that in each radial section, the intersection of the interface surface with the radially outer surface of the tread is axially on the inside of the intersection of the interface surface with the surface of the tread in contact with the said sub-tread. Such an arrangement allows the endurance of the tire to be extended.

Of course, it may be advantageous to combine several or even all of the embodiments described above.

BRIEF DESCRIPTION OF THE DRAWINGS

All the figures in this document are schematic.

DETAILED DESCRIPTION OF THE INVENTION

When using the term "radial" it is appropriate to make a distinction between the various different uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards smaller (or larger) radii. It is this sense of the term that applies also when matters of radial distances are being discussed.

By contrast, a thread or a reinforcement is said to be "radial" when the thread or the reinforcing elements of the reinforcement make an angle greater than or equal to 80° and less than or equal to 90° with the circumferential direction.

Let us specify that, in this document, the term "thread" is to be understood in a very general sense and comprises threads in the form of monofilaments, multifilaments, cords, folded yarns or equivalent assemblies, irrespective of the material of which the thread is made or of any surface treatment it may have received in order to enhance its bonding with the rubber compound in which it is embedded.

Finally, a "radial section" or "radial cross section" here means a section or a cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further away from the median plane of the tire than is the point P8. The "median plane" of the tire is the plane which is perpendicular to the axis of rotation of the tire and which lies equal distances from the annular reinforcing structures of each bead. When the median plane is said to separate, in any radial section, the tire into two tire "halves", that does not mean that the median plane necessarily constitutes a plane of symmetry of the tire. The expression "tire half" here has a broader meaning and denotes a portion of the tire that has an axial width of close to half the axial width of the tire.

A "circumferential" direction is a direction which is perpendicular both to a radius of the tire and to the axial direction.

The "rolling surface" of a tread in this document denotes all those points on the tread that come into contact with the ground when the tire—inflated to its service pressure—is running along the ground.

In the context of this document, the expression "rubber compound" denotes a compound of rubber containing at least one elastomer and a filler.

In this document, "tan δ" denotes a dynamic property well known to those skilled in the art. This property is measured on a Metravib VA4000 viscoanalyser on test specimens moulded from uncured compositions or on test specimens which have been bonded from cured compositions. Test specimens such as those described in Standard ASTM D 5992-96 (the version published in September 2006, initially approved in 1996) in Figure X2.1 (circular embodiment) are used. The diameter "d" of the test specimen is 10 mm (it therefore has a circular cross section of 78.5 mm$^2$), the thickness "L" of each of the portions of rubber composition is 2 mm, giving a "d/L" ratio of 5 (in contrast with Standard ISO 2856 mentioned in the ASTM Standard, paragraph X2.4, which recommends a d/L value of 2).

The response of a test specimen of vulcanized rubber composition subjected to a simple alternating sinusoidal shear loading at a frequency of 10 Hz and a stabilized temperature at the recommended value (for example, 23° C.) is recorded. The test specimen is loaded symmetrically about its equilibrium position. The sweep covers amplitudes of deformation from 0.1% to 50% (peak-peak; on the outward cycle; 12 measurement points), then from 50% to 0.1% (peak-peak; on the return cycle; 11 measurement points). Following each data acquisition, the dynamic shear elastic modulus (or "dynamic modulus"; G') and the viscous shear modulus (G") on the return cycle, together with the loss factor "tan δ", which corresponds to the ration G"/G', are calculated.

The "complex modulus" G* is defined as the absolute value of the complex sum of the elastic modulus G' and viscous modulus G":

$$G^* = \sqrt{G'^2 + G''^2}.$$

Figure 1:
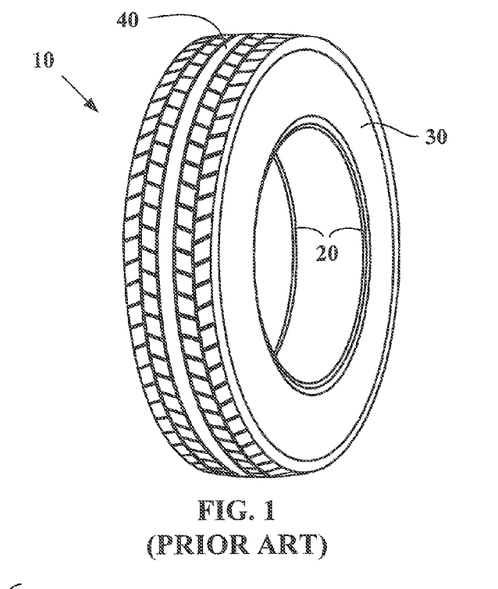
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inwards, and two beads 20 radially on the inside of the sidewalls 30.

Figure 2:
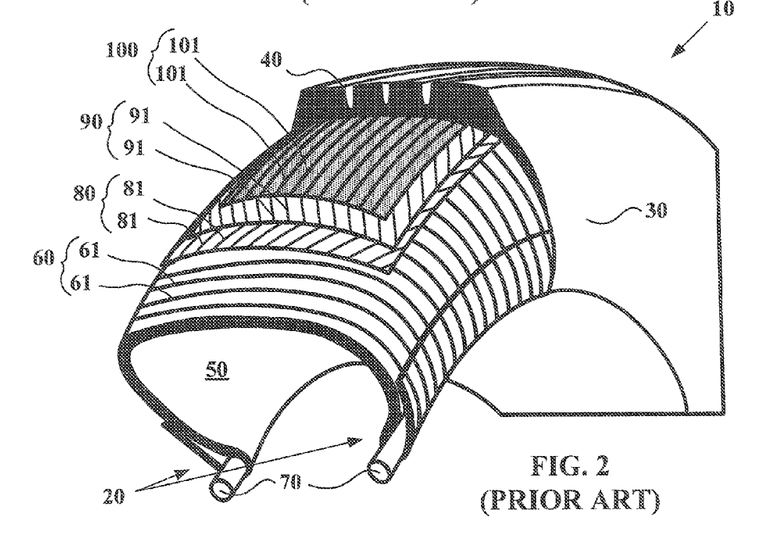
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 made up of threads 61 coated in rubber compound, and two beads 20 each comprising circumferential reinforcements 70 (in this instance bead wires) which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced with threadlike reinforcing elements 81 and 91 which are parallel within each layer and crossed from one layer to the other, making angles of between 10° and 70° with the circumferential direction. The tire further comprises a hooping reinforcement 100, situated radially on the outside of the crown reinforcement, this hooping reinforcement being made up of reinforcing elements 101 directed circumferentially and wound in a spiral. A tread 40 is laid on the hooping reinforcement; it is this tread 40 via which the tire 10 makes contact with the road. The tire 10 depicted is a "tubeless" tire; it comprises an "inner liner" 50 made of a rubber compound that is impervious to the inflating gas, covering the interior surface of the tire.

Figure 3:
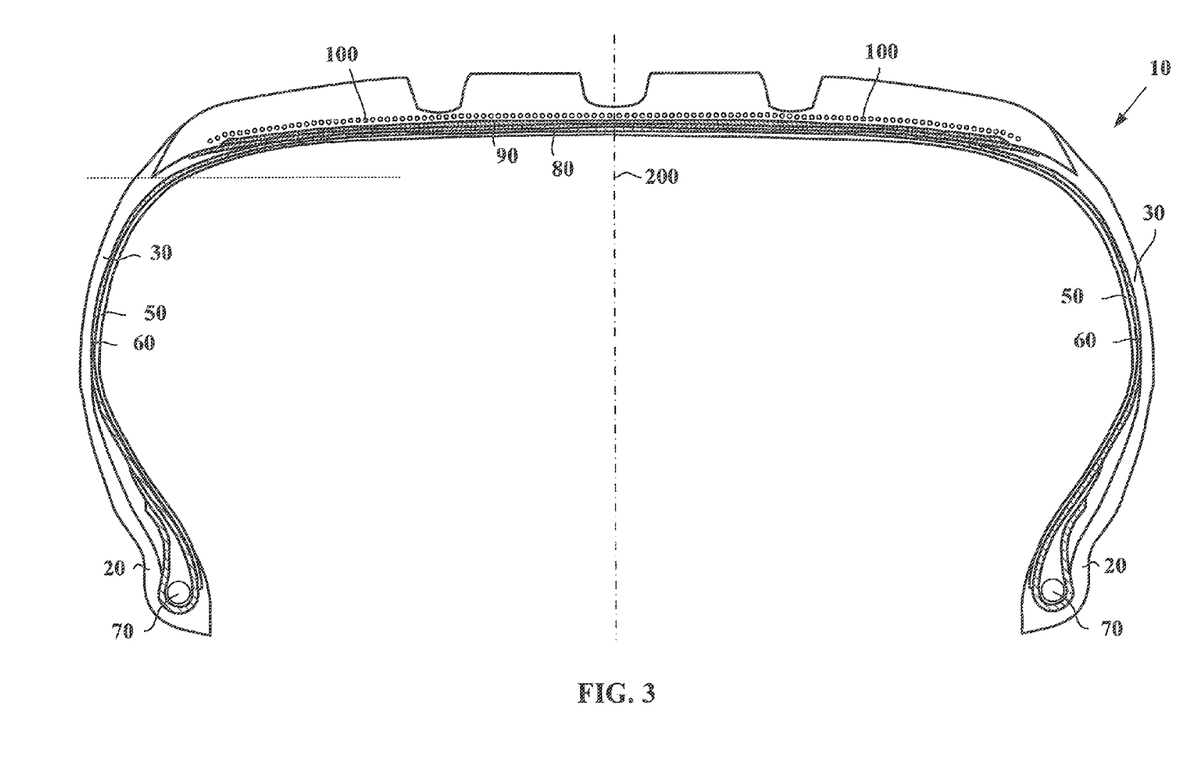
FIG. 3 depicts, in radial section, a reference tire.
Figure 4:
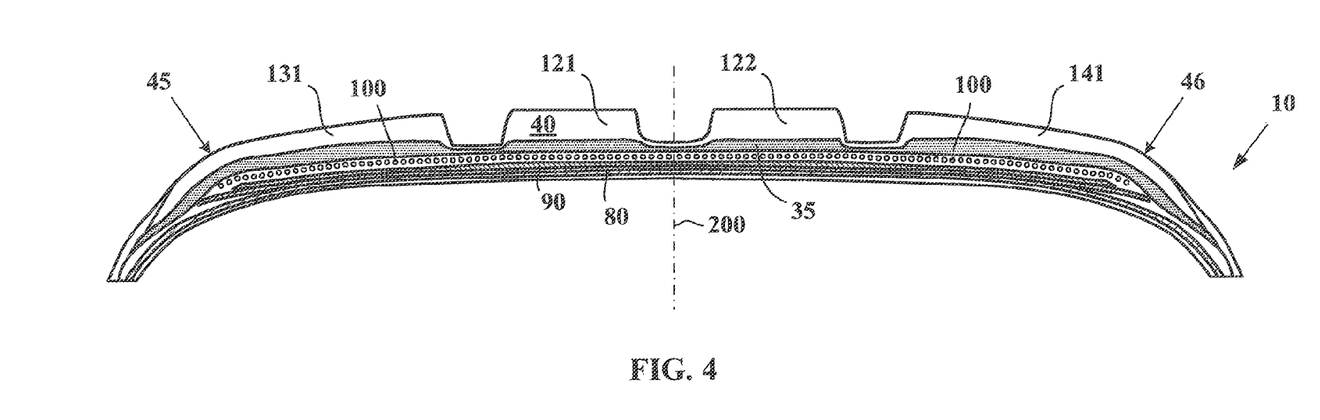
FIG. 4 depicts the crown of the reference tire of FIG. 3

FIG. 3 depicts, in radial section, a portion of a reference tire 10. This is a tire of the "Energy Saver" type marketed by Michelin, of size 205/55 R16. FIG. 4 depicts the crown of this same tire. The tire 10 notably comprises two beads 20 intended to come into contact with a mounting rim (not depicted), each bead comprising at least one annular reinforcing structure 70 (in this instance a bead wire) defining a median plane 200 perpendicular to the axis of rotation of the tire (not depicted) and situated equidistant from the annular reinforcing structures of each bead. The tire 10 also comprises two side walls 30 extending the beads 20 radially outwards, the two sidewalls meeting in a crown comprising a crown reinforcement formed by two plies 80 and 90, which is radially surmounted by a sub-tread 35 (shown in FIG. 4) extending across the entire axial width of the crown reinforcement. The sub-tread 35 is surmounted by a tread 40 (see FIG. 4) provided with a tread pattern formed of elements in relief. The tread 40, in each radial section, has a first axial edge 45 and a second axial edge 46 (see FIG. 4).

Figures 6, 7:
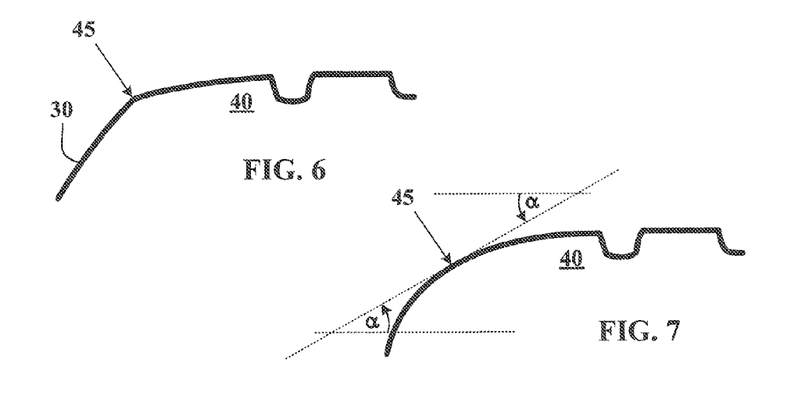
FIGS. 6 and 7 illustrate how the axial edge of a tread is determined.

The way in which the axial edges of a tread are determined is illustrated in FIGS. 6 and 7 each of which show the profile of part of the tread 40 and part of the sidewall 30 adjacent to it. In certain tire designs, the transition from the tread to the sidewall is clear-cut, as in the case depicted in FIG. 6, and the axial edge 45 of the tread 40 can be determined intuitively. However, there are tire designs in which the transition between tread and sidewall is continuous. An example is given in FIG. 7. The edge of the tread is then determined as follows. The tangent to the surface of the tire is plotted, in a radial section of the tire, for every point of the surface in the transition zone between the tread and the sidewall. The axial edge is the point at which the angle α (alpha) between the said tangent and an axial direction is equal to 30°. When there are a plurality of points for which the angle α (alpha) between the said tangent and an axial direction is equal to 30°, the point adopted is the radially outermost point. In the case of the tread depicted in FIG. 4, the axial edges 45 and 46 have been determined in this way.

Figure 8:
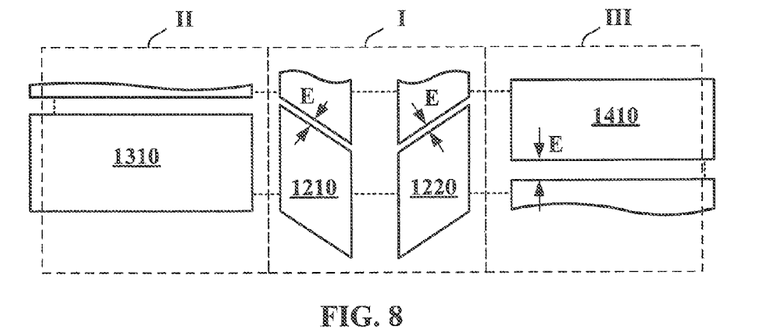
FIGS. 8 and 9 depict part of the tread of the reference tire and of a tire according to an embodiment of the invention, viewed from a standpoint radially on the outside of the tread.

As suggested by FIG. 8, which depicts part of the tread 40 of the tire 10, from a standpoint radially on the outside of the tread 40, the tread comprises a central part (bearing the reference I in FIG. 8) comprising two circumferential ribs 121 and 122 (see FIG. 4) and two lateral parts (bearing the references II and III in FIG. 8) each comprising one circumferential rib 131 and 141 (FIG. 4). The entire tread is made from the same rubber compound. Table I summarises certain characteristics of the rubber compounds used for the sub-tread 35 and the tread 40.

TABLE I

|  | Sub-tread 35 | Tread 40 |
| --- | --- | --- |
| G* (10 Hz/10%/23° C.) | 3.00 | 2.25 |
| tanδ (10%/23° C.) | 0.100 | 0.290 |

The two ribs of the central part are formed of a plurality of blocks 1210 and 1220 separated by sipes; the mean distance E separating two adjacent blocks is equal to 0.8 mm, and the number of blocks in each rib is equal to 80.

The ribs 131 and 141 of the two lateral parts are formed of a plurality of blocks 1310 and 1410 separated by sipes; the mean distance E separating two adjacent blocks is equal to 5.4 mm, and the number of blocks in each rib is equal to 80.

Figure 5:
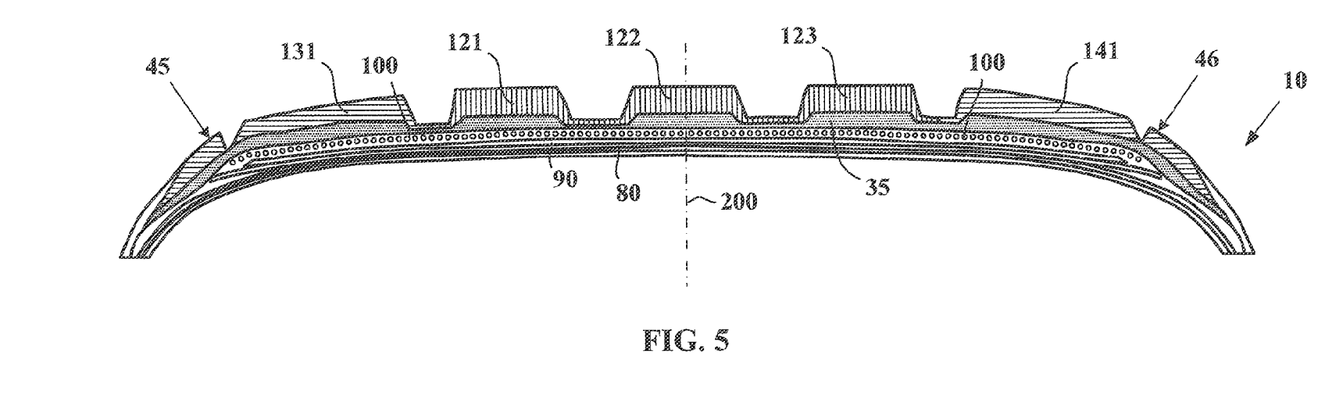
FIG. 5 depicts, in radial section, the crown of a tire according to an embodiment of the invention.
Figure 9:
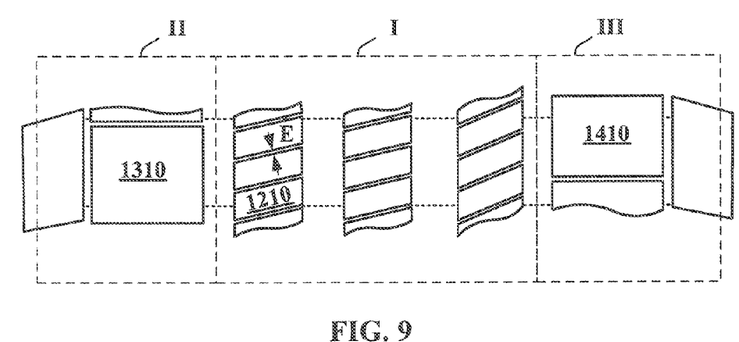

FIG. 5 depicts the crown of a tire 10 according to an embodiment of the invention. The parts (sidewall and bead) that have not been depicted are identical to those of the reference tire depicted in FIG. 3. FIG. 9 depicts part of the tread of this tire 10, from a standpoint radially on the outside of the tread.

The tread comprises a central part I (FIG. 9) made of a first rubber compound and extending, in each radial section, on either side of the median plane, between a first axial end and a second axial end. The central part comprises three circumferential ribs 121, 122 and 123 (FIG. 5) each of which is formed of a plurality of blocks (like the block 1210 of the groove 121 of FIG. 9), separated by sipes. The mean distance E separating two adjacent blocks is equal to 0.3 mm, and the number of blocks is equal to 200.

The tread comprises a first lateral part II (FIG. 9) made of a second rubber composition and extending from the first axial edge 45 of the tread (see FIG. 5) as far as the first axial end of the central part. The first lateral part II comprises a circumferential rib 131 (FIG. 5) formed of a plurality of blocks (1310) (see FIG. 9), separated by sipes. The mean distance E separating two adjacent blocks is equal to 1 mm, the number of blocks is less than the number of blocks that make up the said at least one circumferential rib of the central part; in this instance it is equal to 100.

The tread further comprises a second lateral part III (FIG. 9) made of a third rubber compound (in this instance identical to the second rubber compound) and extending from the second axial edge 46 of the tread (see FIG. 5) as far as the second axial end of the central part. The second lateral part III comprises a circumferential rib 141 (FIG. 5) formed of a plurality of blocks 1410 (see FIG. 9), separated by sipes. The mean distance E separating two adjacent blocks is equal to 1 mm, the number of blocks is less than the number of blocks that make up the said at least one circumferential rib of the central part; in this instance it is equal to 100.

In this particular instance, the boundaries between the central part I and the first and second lateral parts II and III lie in circumferential grooves of the tread.

Table II gives, by way of example, the formulation of rubber compounds that can be used to make the tread and a sub-tread of a tire according to an embodiment of the invention. The formulation is given in phr ("per hundred rubber"), namely in parts by weight per 100 parts by weight of elastomer. The corresponding values for G* (10 Hz/10%/23° C.) and tan δ (10%/23° C.) are likewise given. BR1, BR2 and BR3 denote the said first, second and third rubber compounds, BR-T denotes a reference compound; SC denotes the rubber compound of the sub-tread and SC-T a reference sub-tread compound.

TABLE II

| Parts in phr | BR1 | BR2 = BR3 | BR-T | SC | SC-T |
|---|---|---|---|---|---|
| NR | — | — | — | 60 | 60 |
| SBR A [1] | 100 | 100 | — | — | — |
| SBR B [2] | — | — | 20 | — | — |
| BR [3] | — | — | 80 | 40 | 40 |
| N 234 | 3 | 3 | 3 | — | — |
| N 683 | — | — | — | 30 | 60 |
| Silica | 80 | 110 | 73 | — | — |
| Resin [4] | 50 | 34 | 20 | — | — |
| Oleic sunflower oil [5] | 10 | 8 | — | — | — |
| MES/HPD | — | — | 6 | — | — |
| TESPT [6] | 6.4 | 8.8 | 5.8 | — | — |
| DPG [7] | 1.6 | 1.8 | 1.3 | — | — |
| Antioxidant [8] | 2.7 | 2.7 | 2.2 | 1.3 | 1.3 |
| Stearic acid | 2 | 2 | 1.6 | 0.5 | 0.5 |
| ZnO | 1.2 | 1.2 | 1.0 | 3 | 3 |
| Accelerant [9] | 2.3 | 2.3 | 1.6 | 1.5 | 1.5 |
| Sulphur | 1 | 1 | 1 | 2.5 | 2.5 |
| G* (10Hz/10%/23° C.) | 3.50 | 1.45 | 2.25 | 1.40 | 3.00 |
| tanδ (10%/23° C.) | 0.360 | 0.220 | 0.290 | 0.04 | 0.100 |

Annotations in Table II:
[1] SSBR with 24% 1,2-polybutadiene units; 26.5% stirene; Tg=−48° C.
[2] SSBR with 58% 1,2-polybutadiene units; 25% stirene; Tg=−30° C.
[3] BR (with 0.3% of 1,2-; 2.7% trans) 97% cis-1,4-; Tg=−103° C.
[4] High Tg plasticizing resin "Escorez 5600" marketed by the Exxon company
[5] "Lubrirob TOD 1880" marketed by the Novance company
[6] TESPT ("Si69" by the Evonik company);
[7] Diphenylguanidine ("Vulcacit D" by the Bayer company)
[8] N-1,3-dimethylbutyl-N-phenyl-para-phenylenediamine ("Santoflex 6-PPD" by the Flexsys company)
[9] N-cyclohexyl-2-benzothiazyl-sulphenamide (CBS; "Santocure" by the Flexsys company).

The rubber composition is preferably based on at least one diene elastomer, a reinforcing filler and a crosslinking system.

A "diene" elastomer (used interchangeably with the word rubber) means, in the known way, an elastomer derived at least in part (i.e. a homopolymer or a copolymer) of diene monomers which means monomers carrying two carbon-carbon double bonds, conjugated or otherwise. The diene elastomer used is preferably selected from the group consisting of polybutadienes (BR), natural rubber (NR), synthetic polyisoprenes (IR), butadiene-stirene copolymers (SBR), isoprene-butadiene copolymers (BIR), isoprene-stirene copolymers (SIR), butadiene-stirene-isoprene copolymers (SBIR) and blends of these elastomers.

One preferred embodiment is to use an "isoprene" elastomer which means a homopolymer or copolymer of isoprene, in other words a diene elastomer selected from the group consisting of natural rubber (NR), synthetic polyisoprenes (IR), the various copolymers of isoprene and blends of these elastomers.

The isoprene elastomer is preferably natural rubber or a synthetic polyisoprene of cis-1,4 type. Among these synthetic polyisoprenes, use is preferably made of polyisoprenes that have a cis-1,4 bonds content (mol %) higher than 90%, more preferably still, higher than 95%. According to other preferential embodiments, the diene elastomer may consist, in full or in part, of another diene elastomer such as, for example, an SBR elastomer (E-SBR or S-SBR) used cut or otherwise with another elastomer, for example of the BR type.

The rubber composition may also contain all or some of the additives conventionally used in rubber matrices intended for the manufacture of tires, such as, for example, reinforcing fillers such as carbon black or inorganic fillers such as silica, coupling agents for inorganic filler, anti-ageing agents, antioxidants, plasticizers or extension oils, whether the latter are of aromatic or non-aromatic nature (notably oils which are very weakly or not at all aromatic, for example of the naphthene or paraffin oil type, of high or preferably low viscosity, MES or TDAE oils), plasticizing resins with a high Tg above 30° C.), processability agents to aid the processing of compositions in the uncured state, tackifying resins, a crosslinking system based either on sulphur or on donors of sulphur and/or peroxide, vulcanization activators or retardants or accelerators, anti-reversion agents, methylene acceptors and donors such as, for example HMT (hexamethylenetetramine) or H3M (hexamethoxymethylmelamine), reinforcing resins (such as resorcinol or bismaleimide).

The compositions are produced in suitable mills using two successive preparation phases well known to those skilled in the art: a first phase of thermomechanical kneading or working (the phase referred to as the "non-productive" phase) at high temperature, up to a maximum temperature of between 110° C. and 190° C., preferably between 130° C. and 180° C., followed by a second phase of mechanical work (phase referred to as the "productive" phase) down to a lower temperature, typically of less than 110° C., during which finishing phase the crosslinking system is incorporated.

By way of example, the non-productive phase is performed in a single thermomechanical step lasting a few minutes (for example between 2 and 10 min) during which all the necessary basic constituents and other additives apart from the crosslinking or vulcanization system are introduced into a suitable mill such as a conventional internal mixer. Once the mixture thus obtained has cooled, the vulcanization system is then incorporated in an external mixer such as an open mill, kept at a low temperature (for example of between 30° C. and 100° C.). The mixture is then mixed (productive phase) for a few minutes (for example between 5 and 15 min).

The final composition thus obtained is then calendered, for example into the form of a sheet or plate for characterizing, or is alternatively extruded, to form the tread or the sub-tread used in a tire according to an embodiment of the invention.

Vulcanization (or curing) can then be carried out in the known way at a temperature generally of between 130° C. and 200° C., preferably under pressure, for a sufficient length of time which may vary for example between 5 and 90 min notably depending on the curing temperature, on the vulcanization system adopted and on the vulcanization dynamics of the composition in question.

Figure 10:
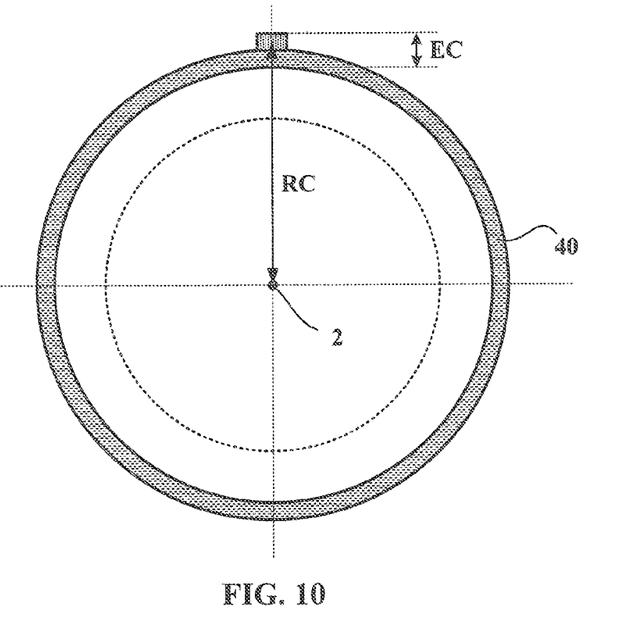
FIG. 10 depicts a section along the median plane of the tire of FIG. 5 and illustrates how certain parameters of a tire according to an embodiment of the invention are determined.
Figure 11:
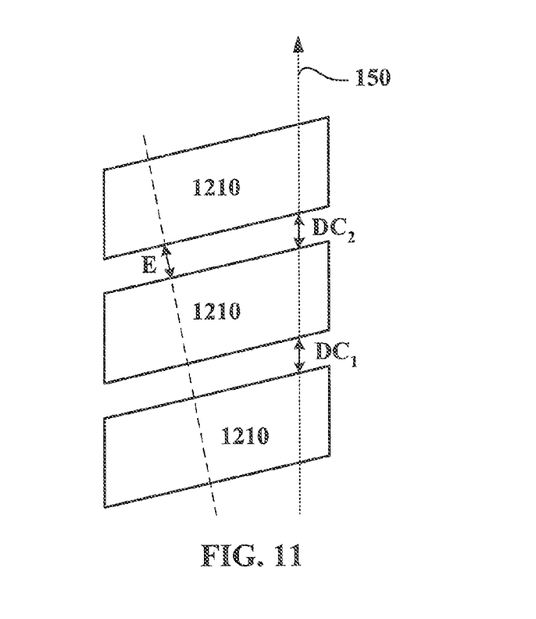
FIG. 11 illustrates certain measurements used to characterize a tire according to an embodiment of the invention.

Let "EC" denote the mean radial thickness of the tread measured at the rib of the central part, and let "RC" denote the mean radius of the rib of the central part (see FIG. 10 in which the reference 2 denotes the axis of rotation of the tire). "SLEC" denotes the sum of the mean circumferential widths of the sipes of the rib of the central part. These widths must not be confused with the mean distances E mentioned earlier. As suggested by FIG. 11, which depicts part of a central rib, these distances correspond to the geometric distance between the walls of two adjacent blocks 1210, whereas the mean circumferential widths are determined in a circumferential direction 150. If $DC_1$, $DC_2$ ... $DC_N$ denote the circumferential widths of the sipes between the N blocks that make up the rib, SLEC is defined as the sum $DC_1 + DC_2 + \ldots + DC_N$. The measurements EL, RL and SLEL for the ribs of the lateral parts of the tread are defined in the same way.

The tire of FIG. 5 therefore yields the following table:

TABLE III

| | Reference tire | Tire according to an embodiment of the invention |
|---|---|---|
| EC (mm) | 10 | 10 |
| EL (mm) | 10 | 10 |
| RC (mm) | 312.5 | 312.5 |
| RL (mm) | 308 | 308 |
| SLEC (mm) | 80 (rib 1) | 65 |
| | 156 (rib 2) | |
| SLEL (mm) | 435 | 105 |
| EC/RC | 0.032 | 0.032 |
| 0.9 · EC/RC | 0.0288 | 0.0288 |
| SLEC/(2 · π · RC) | 0.0407 (rib 1) | 0.0331 |
| | 0.0795 (rib 2) | |
| 1.1 · EC/RC | 0.0352 | 0.0352 |
| EL/RL | 0.0325 | 0.0325 |
| 1.5 · EL/RL | 0.0487 | 0.0487 |
| SLEL/(2 · π · RL) | 0.225 | 0.0543 |

It may be noted that the tire according to an embodiment of the invention satisfies the criteria 0.90·EC/RC<SLEC/(2·π·RC)<1.10·EC/RC and 1.50·EL/RL<SLEL/(2·π·RL) whereas the reference tire satisfies only the second criterion.

A tire according to an embodiment of the invention, corresponding to the tire depicted in FIG. 5 (using the compositions BR1, BR2, BR3 and SC of Table II), and a reference tire corresponding to the tire depicted in FIG. 4 (using the compounds BR-T and SC-T of Table II) were compared in terms of running (size investigated: 205/55 R16). The tire according to an embodiment of the invention improved rolling resistance by 1.0 kg per tonne by comparison with the reference tire, for the same cornering stiffness, when used under the same load and at the same tire inflation pressure.

The invention claimed is:

1. A tire comprising:
two beads intended to come into contact with a mounting rim, each bead comprising at least one annular reinforcing structure defining a median plane perpendicular to an axis of rotation of the tire and situated equidistant from the annular reinforcing structures of each bead,
two sidewalls extending the beads radially outwards, the two sidewalls meeting in a crown comprising a crown reinforcement radially surmounted by a sub-tread extending across an entire axial width of the crown reinforcement and itself surmounted by a tread provided with a tread pattern formed of elements in relief, the tread having, in each radial section, a first axial edge and a second axial edge;
wherein the tread comprises:
a central part made of at least one first rubber compound extending, in each radial section, on either side of the median plane, between a first axial end and a second axial end, the central part comprising at least one circumferential rib, each rib being formed of a plurality of blocks separated by sipes so that a mean distance separating two adjacent blocks is less than 0.8 mm, a number of blocks being greater than or equal to 100;
a first lateral part made of at least one second rubber compound, extending from the first axial edge of the tread as far as the first axial end of said central part, the first lateral part comprising at least one circumferential rib formed by a plurality of blocks separated by sipes so that a mean distance separating two adjacent blocks is greater than 0.8 mm and less than 5 mm, a number of blocks being less than the number of blocks that make up each at least one circumferential rib of the central part; and
a second lateral part made of at least one third rubber compound, extending from the second axial edge of the tread as far as the second axial end of said central part, the second lateral part comprising at least one circumferential rib formed by a plurality of blocks separated by sipes so that a mean distance separating two adjacent blocks is greater than 0.8 mm and less than 5 mm, a number of blocks being less than the number of blocks that make up each at least one circumferential rib of the central part;
wherein the at least one second and third rubber compounds have a value of tan δ at 23° C., at a frequency of 10 Hz and an elongation of 10%, which is less than 0.25; and
wherein the complex modulus G*(T) of said at least one first rubber compound is greater than the complex moduli G*(T) of said at least one second and third rubber compounds for all temperatures T greater than or equal to 0° and less than or equal to 60° C.,
wherein each rib of the central part satisfies the following inequality:

$$0.90 \cdot EC/RC < SLEC/(2 \cdot \pi \cdot RC) < 1.10 \cdot EC/RC$$

where EC denotes the mean radial thickness of the tread measured at each rib of the central part, RC denotes the mean radius of ech rib of the central part, and SLEC denotes the sum of the mean circumferential widths of the sipes of each rib of the central part, and
wherein each rib of the first lateral part and of the second lateral part satisfies the following inequality:

$$1.50 \cdot EL/RL < SLEL/(2 \cdot \pi \cdot RL)$$

where EL denotes the mean radial thickness of the tread measured at each rib of the lateral part, RL denotes the mean radius of each rib of the lateral part, and SLEL denotes the sum of the mean circumferential widths of the sipes of each rib of the lateral part.

2. A tire comprising:
two beads intended to come into contact with a mounting rim, each bead comprising at least one annular reinforcing structure defining a median plane perpendicular to an axis of rotation of the tire and situated equidistant from the annular reinforcing structures of each bead, two sidewalls extending the beads radially outwards, the two sidewalls meeting in a crown comprising a crown reinforcement radially surmounted by a sub-tread extending across an entire axial width of the crown reinforcement and itself surmounted by a tread provided with a tread pattern formed of elements in relief, the tread having, in each radial section, a first axial edge and a second axial edge;

wherein the tread comprises:

a central part made of at least one first rubber compound extending, in each radial section, on either side of the median plane, between a first axial end and a second axial end, the central part comprising at least two circumferential ribs, each rib being formed of a plurality of blocks separated by sipes so that a mean distance separating two adjacent blocks is less than 0.8 mm, a number of blocks in each rib being greater than or equal to 100;

a first lateral part made of at least one second rubber compound, extending from the first axial edge of the tread as far as the first axial end of said central part, the first lateral part comprising at least one circumferential rib formed by a plurality of blocks separated by sipes so that a mean distance separating two adjacent blocks is greater than 0.8 mm and less than 5 mm, a number of blocks being less than the number of blocks that make up each of the at least two circumferential ribs of the central part; and a second lateral part made of at least one third rubber compound, extending from the second axial edge of the tread as far as the second axial end of said central part, the second lateral part comprising at least one circumferential rib formed by a plurality of blocks separated by sipes so that a mean distance separating two adjacent blocks is greater than 0.8 mm and less than 5 mm, a number of blocks being less than the number of blocks that make up each of the at least two circumferential ribs of the central part;

wherein the at least one second and third rubber compounds have a value of tan $\delta$ at 23° C., at a frequency of 10 Hz and an elongation of 10%, which is less than 0.25;

wherein the complex modulus $G^*(T)$ of said at least one first rubber compound is greater than the complex moduli $G^*(T)$ of said at least one second and third rubber compounds for all temperatures T greater than or equal to 0° and less than or equal to 60° C., and wherein each of said at least two ribs of the central part satisfies the following inequality:

$$0.90 \cdot EC/RC < SLEC/(2 \cdot \pi \cdot RC) < 1.10 \cdot EC/RC$$

where EC denotes the mean radial thickness of the tread measured at each rib of the central part, RC denotes the mean radius of each rib of the central part, and SLEC denotes the sum of the mean circumferential widths of the sipes of each rib of the central part, and wherein each rib of the first lateral part and of the second lateral part satisfies the following inequality:

$$1.50 \cdot EL/RL < SLEL/(2 \cdot \pi \cdot RL)$$

where EL denotes the mean radial thickness of the tread measured at each rib of the lateral part, RL denotes the mean radius of each rib of the lateral part, and SLEL denotes the sum of the mean circumferential widths of the sipes of each rib of the lateral part.

3. The tire according to claim 2, wherein the sub-tread is made of at least one fourth rubber compound having a complex modulus $G^*(T)$ and a value of tan $\delta$ at 23° C., at a frequency of 10 Hz and an elongation of 10%, which are such that the complex modulus $G^*(T)$ of the sub-tread is less than the complex moduli $G^*(T)$ of said at least one first, second and third rubber compounds for all temperatures T greater than or equal to 0° and less than or equal to 60° C., and that its value of tan $\delta$ is less than the tan $\delta$ value of said at least one first, second and third rubber compounds.

4. The tire according to claim 2, wherein the at least one third rubber compound is identical to said at least one second rubber compound.

5. The tire according to claim 2, wherein each boundary between said central part and said first and second lateral parts lies in a circumferential groove of the tread.

6. The tire according to claim 2, wherein each boundary between said central part and each of the said first and second lateral parts is formed of an interface surface, the interface surface being inclined with respect to the median plane so that in each radial section, the intersection of the interface surface with the radially outer surface of the tread is axially on the inside of the intersection of the interface surface with the surface of the tread in contact with said sub-tread.

7. The tire according to claim 2, wherein the central part consists of two circumferential ribs.

8. The tire according to claim 2, wherein the central part consists of three circumferential ribs.

* * * * *